United States Patent [19]

Kishi et al.

[11] Patent Number: 4,692,873
[45] Date of Patent: Sep. 8, 1987

[54] MACHINE TOOL PICK FEED METHOD

[75] Inventors: Hajimu Kishi; Kunio Tanaka, both of Tokyo, Japan

[73] Assignee: Fanuc Ltd., Yamanashi, Japan

[21] Appl. No.: 752,075

[22] PCT Filed: Oct. 30, 1984

[86] PCT No.: PCT/JP84/00523
§ 371 Date: Jun. 25, 1985
§ 102(e) Date: Jun. 25, 1985

[87] PCT Pub. No.: WO85/01909
PCT Pub. Date: May 9, 1985

[30] Foreign Application Priority Data

Oct. 31, 1983 [JP] Japan ................................ 58-204575

[51] Int. Cl.$^4$ ......................................... B23Q 15/013
[52] U.S. Cl. .................................................... 364/474
[58] Field of Search ............... 364/474, 475, 167, 168, 364/169; 318/570, 567, 568

[56] References Cited

U.S. PATENT DOCUMENTS

4,266,172 5/1981 Yamazaki ........................... 364/474
4,386,408 5/1983 Imazeki .............................. 364/474

Primary Examiner—Jerry Smith
Assistant Examiner—Allen MacDonald
Attorney, Agent, or Firm—Staas & Halsey

[57] ABSTRACT

A curved surface machining method for machining a curved surface through unidirectional cutting by automatically creating a pick-feed path that will not cause a tool (TL) to strike a workpiece when a pick-feed is performed, pick-feeding the tool along the path, and thereafter performing cutting. The pick-feed path is obtained by using a given tool retraction quantity l for retracting the tool from a cutting path end point Pe, a clearance plane (CPL), coordinate values of the cutting end point Pe, and coordinate values of a cutting starting point Ps on the next cutting path. Specifically, there are obtained: coordinate values of a point Pa distanced from the cutting path end point Pe by the tool retraction quantity l in the direction of the central axis of the tool; coordinate values of the foot Pb of a perpendicular dropped from the point Pa to the clearance plane (CPL); coordinate values of a point Pd distanced from the cutting starting point Ps of the next cutting path (PT2) by the tool retraction quantity l in the direction of the central axis of the tool; and coordinate values of the foot Pc of a perpendicular dropped from the point Pd to the clearance plane. The path Pe→Pa→Pb→Pc→Pd→Ps serves as the pick-feed path.

5 Claims, 7 Drawing Figures

MACHINE TOOL PICK FEED METHOD

BACKGROUND OF THE INVENTION

This invention relates to a machining method performed by a machine tool having axes of rotation for subjecting a workpiece to desired machining by performing the following: moving a tool relative to a workpiece along a cutting path from a predetermined direction to perform machining positioning the tool at a machining starting point on the next cutting path after the completion of machining along the abovementioned cutting path; thereafter moving the tool relative to the workiece along the next cutting path from the predetermined direction to perform machining, and thereafter repeating the foregoing operations. More particularly, the invention relates to a machining tool machining method whereby a path from a machining end point to a machining starting point can be created automatically such that the tool will not be allowed to strike the workpiece when the tool is moved.

Figure 1:
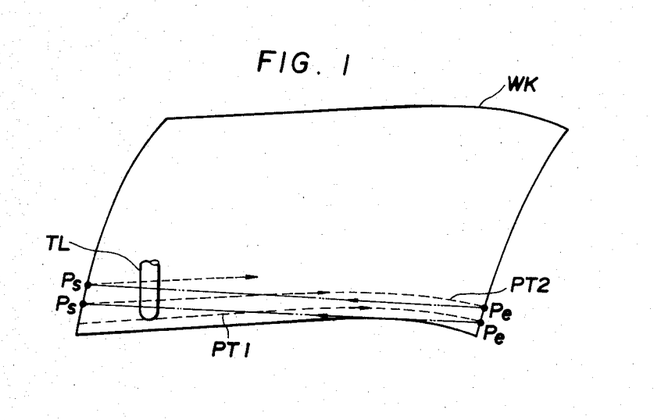
FIG. 1 illustrates a tool path for a case where a curved surface is machined by repeating pick-feed and unidirectional cutting.

In the numerically controlled machining of a curved surface, as shown in FIG. 1, there are cases where a workpiece is subjected to desired machining which includes: moving a tool TL at a cutting velocity from left to right along a predetermined cutting path PT1 on a workpiece WK to perform machining; moving the tool in a rapid-traverse mode from an end point Pe to a cutting starting point Ps on the next cutting path PT2 at the conclusion of machining along the abovementioned path; then moving the tool at the cutting velocity along the next cutting path while maintaining the abovementioned cutting direction; and thereafter repeating this unidirectional cutting operation. In such numerically controlled machining of a curved surface, machining is carried out in such a manner that the central axis (the one-dot chain line in FIG. 1) of the tool TL is directed normal to the workpiece WK or oriented in a direction having a fixed angle of inclination with respect to the direction of the normal line at all times. Consequently, by way of example, the machine tool is arranged to rotate the tool while the tool is being moved along orthogonal axes in three dimensions, whereby machining can be performed while the direction of the central axis of the tool is brought into agreement with the direction of the normal line to the workpiece at all times. NC data specifying the tool path includes position data (position vectors) for specifying the position of the tool nose, and tool central axis direction data (positions along B and C axes or tool central axis vector) for specifying the direction of the tool central axis. Note that the B and C axes are vertical and horizontal axes of rotation.

In the machining of a curved surface by such unidirectional cutting, the tool nose will strike the workpiece at high speed when pick-feed is performed, thereby resulting in an erroneous cutting operation or in damage to the tool, unless an appropriate pick-feed path from the first machining end point Pe to the second machining starting point Ps is decided. Previously, when performing pick-feed the pick-feed paths were decided so that the tool nose will not contact the workpiece, and each pick-feed path is programmed as NC data.

However, in the conventional method, a pick-feed path that will not cause a tool to interfere with a workpiece cannot be determined for any and all curved surfaces through a simple technique because each pick-feed path must be individually programmed. As a result, creating the NC data can be a troublesome task. In addition, to assure that the tool will not interfere with the workpiece, with the conventional method the tool retraction stroke is enlarged and, hence, so is the pick-feed stroke. This is disadvantageous in that actual machining time is prolonged.

Figure 2:
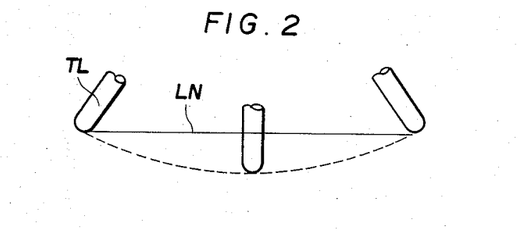
FIG. 2 illustrates the trajectory of a tool nose for a case where a machine tool includes axes of rotation.

The foregoing drawbacks become even more pronounced especially when performing pick-feed while rotating the tool in the directions of the B and C axes. The reason is that even when the path of travel of the tool TL of a machine tool having axes of rotation is a straight line LN in three dimensions X, Y and Z, as shown in FIG. 2, the path traversed by the tool nose is unpredictable rather than linear, as indicated by the dashed line in FIG. 1, when the tool is rotated in the directions of the B and C axes at the same time that it is moved along the straight line.

SUMMARY OF THE INVENTION

Accordingly, an object of the present invention is to provide a machine tool machining method whereby a pick-feed path that will not cause a tool to strike a workpiece when a pick-feed is performed can be decided in a simple manner.

Another object of the present invention is to provide a machine tool machining method whereby NC data for machining a curved surface, which data will not cause a tool to strike a workpiece when a pick-feed is performed, can be created automatically, and so that a curved surface can be machined by using these NC data.

Still another object of the present invention is to provide a machine tool machining method whereby when a pick-feed command or a command for creating a pick-feed path is inserted into an NC program in advance, a pick-feed path that will not cause a tool to strike a workpiece is obtained automatically in response to the command, and the tool is moved along the pick-feed path obtained.

The present invention provides a method of machining a curved surface performed by unidirectional cutting, which method includes automatically creating a pick-feed path that will not cause a tool to strike a workpiece when a pick-feed is performed, pick-feeding the tool along the pick-feed path, and thereafter performing cutting.

A tool retraction quantity l for retracting a tool in the direction of the central axis of the tool from the cutting path end point Pe, and a clearance plane containing a path along which the tool is moved toward the next cutting starting point Ps, are specified in advance. Based on this data the following are obtained: coordinate values of a point Pa distanced from the cutting path end point Pe by the tool retraction quantity l in the direction of the central axis of the tool at the cutting path end point, coordinate values of the foot Pb of a perpendicular dropped from the point Pa to the clearance plane, coordinate values of a point Pd distanced from the cutting path starting point Ps by the tool retraction quantity l in the direction of the central axis of the tool at the cutting path starting point, and coordinate values of the foot Pc of a perpendicular dropped from the point Pd to the clearance plane. If this is done, the path Pe→Pa→Pb→Pc→Pd→Ps will serve as the pick-feed path. Accordingly, after the completion of cutting along one path, a pick-feed path is obtained through the foregoing technique, thereafter the tool is moved along the pick-feed path and positioned at the next cutting starting point Ps, and the tool is then moved along the next cutting path to perform machining. According to this method, a path for positioning the tool from the cutting path end point Pe to the cutting path starting point Ps without the tool striking the workpiece can be created automatically, and a pick-feed can then be performed along the path.

DETAILED DESCRIPTION OF THE PREFERRED EMBODIMENTS

Figure 3:
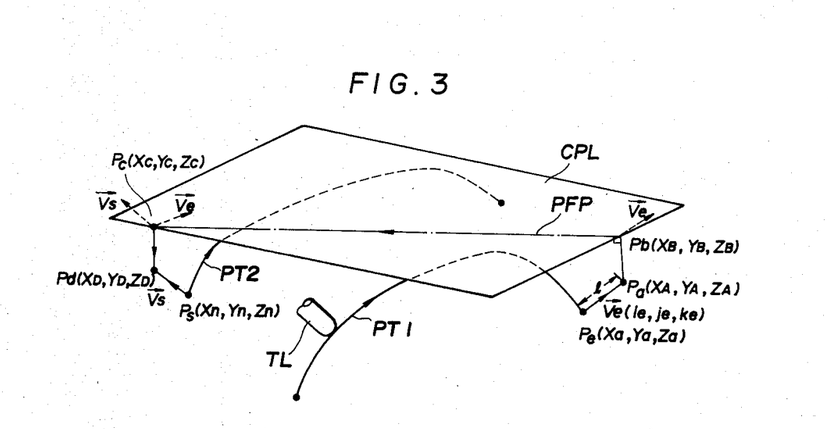
FIG. 3 illustrates the general features of the present invention.

FIG. 3 illustrates the general features of the present invention. A workpiece is subjected to desired machining by performing the following moving a tool TL relative to a workpiece along a cutting path PT1 from one direction to perform machining; positioning the tool at a machining starting point Ps on the next cutting path PT2 after the completion of machining along the abovementioned cutting path (this operation being referred to as a "pick-feed"); thereafter moving the tool relative to the workiece along the next cutting path from the aforementioned direction to perform machining; and subsequently repeating the foregoing operations.

The pick-feed path is obtained by specifying beforehand a tool retraction quantity l for retracting the tool from the cutting path end point Pe in the direction of the central axis of the tool at the cutting path end point, and a clearance plane CPL containing a path PFP along which the tool is to be moved toward the next cutting starting point Ps, and performing processing, now to be described, by using this data.

Specifically, the following are obtained: coordinate values of a point Pa distanced from the cutting path end point Pe by the tool retraction quantity in the direction of the central axis of the tool at the cutting path end point; coordinate values of the foot Pb of a perpendicular from clearance plane to the point Pa; coordinate values of a point Pd distanced from the cutting path starting point Ps by the tool retraction quantity in the direction of the central axis of the tool at the cutting path starting point; and coordinate values of the foot Pc of a perpendicular from the clearance plane CPL to point Pd If this is done, the path Pe→Pa→Pb→Pc→Pd→Ps will serve as the pick-feed path.

Accordingly, after the completion of cutting along one path, a pick-feed path is obtained through the foregoing technique, then the tool is moved along the pick-feed path and positioned at the next cutting starting point Ps, and the tool is thereafter moved along the next cutting path to perform machining.

Figure 4:
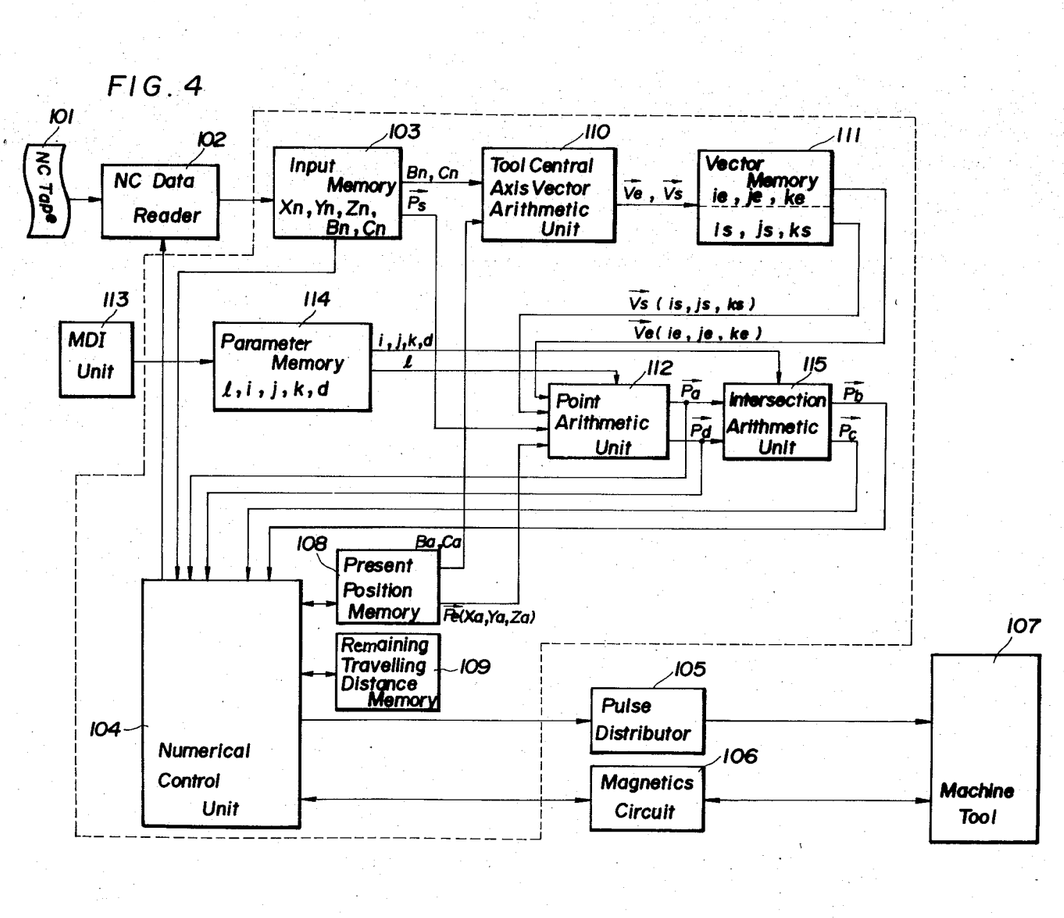
FIG. 4 is a block diagram of an embodiment of the present invention.

FIG. 4 is a block diagram of an embodiment of the present invention. An NC tape or memory (assumed to be an NC tape hereafter) 101 stores NC data. The NC data are so arranged that the tool TL is made to perform cutting along the first machining path PT1 of FIG. 3, to the point Pe in the direction of the arrow on the path PT1. The tool is then pick-fed from the end point Pe to the machining starting point Ps on the second machining path PT2. Next, the tool is made to perform cutting in the direction of the arrow along the second machining path, and therafter is made to repeat this unidirectional cutting operation along subsequent machining paths. Each of the paths PT1, PT2 is approximated by minute polygonal lines, and a pick-feed is indicated by an M-function instruction M□□ (where□□ is a two-digit numerical value). An NC data reader 102 reads the NC data from the NC tape 101 one block at a time and stores the data in an input memory 103. A numerical control unit 104 decodes the NC data stored in the input memory 103. If the NC data are path data, then these data are delivered to a pulse distributor 105. If an item of NC data is an M-, S- or T- function instruction to be delivered to machine tool 107, then the instruction is applied to the machine tool 107 through a magnetics circuit 106. If an item of data is a pick-feed instruction M□□, then the NC data reader 102 is made to read the next block of NC data (data indicative of the starting point of the next machining path).

When an item of NC data is path data, the numerical control unit 104 finds incremental values Xi, Yi, Zi, Bi, Ci along the respective axes (rectangular coordinates axes X, Y, Z, vertical axis of rotation B and horizontal axis of rotation C). The numerical control unit 104 then uses a three-dimensional command velocity F, the incremental values Xi, Yi, Zi along the respective axes in three dimensions, and the incremental values Bi, Ci in the directions of vertical and horizontal rotation, respectively, to obtain velocity components $F_x$, $F_y$, $F_z$, $F_b$, $F_c$ along the respective axes from equations $$F_x = X_i \cdot F / \sqrt{X_i^2 + Y_i^2 + Z_i^2} \tag{1a}$$

$$F_y = Y_i \cdot F / \sqrt{X_i^2 + Y_i^2 + Z_i^2} \tag{1b}$$

$$F_z = Z_i \cdot F / \sqrt{X_i^2 + Y_i^2 + Z_i^2} \tag{1c}$$

$$F_b = B_i \cdot F / \sqrt{X_i^2 + Y_i^2 + Z_i^2} \tag{1d}$$

$$F_c = C_i \cdot F / \sqrt{X_i^2 + Y_i^2 + Z_i^2} \tag{1e}$$

and thereafter obtains travelling quantities $\Delta X$, $\Delta Y$, $\Delta Z$, $\Delta B$, $\Delta C$ which are to be traversed along the respective axes in a predetermined period of time $\Delta T$ sec (e.g., 16 msec), from equations $$\Delta X = F_x \cdot \Delta T \tag{2a}$$

$$\Delta Y = F_y \cdot \Delta T \tag{2b}$$

$$\Delta Z = F_z \cdot \Delta T \tag{2c}$$

$$\Delta B = F_b \cdot \Delta T \tag{2e}$$

$$\Delta C = F_c \cdot \Delta T \tag{23}$$

the numerical control unit delivers $\Delta X$, $\Delta Y$, $\Delta Z$, $\Delta B$, $\Delta C$ to the pulse distributor 105 every $\Delta T$ sec. On the basis of the input data, the pulse distributor 105 performs a simultaneous five-axis pulse distribution calculation to generate distributed pulses Xp, Yp, Zp, Bp, Cp. These are delivered to servo circuits (not shown) for the respective axes to transport the tool along the cutting path.

The numerical control unit 104, in accordance with the following formulae, updates the present position $X_a$, $Y_a$, $Z_a$, $B_a$, $C_a$ in a present position memory 108 every $\Delta T$ sec:

$$X_a \pm \Delta X \rightarrow X_a \tag{3a}$$

$$Y_a \pm \Delta Y \rightarrow Y_a \tag{3b}$$

$$Z_a \pm \Delta Z \rightarrow Z_a \tag{3c}$$

$$B_a \pm \Delta B \rightarrow B_a \tag{3d}$$

$$C_a \pm \Delta C \rightarrow C_a \tag{3e}$$

The sign depends upon the direction of movement. Similarly, in accordance with the following formulae, the numerical control unit 104 updates remaining travelling distances $X_r$, $Y_r$, $Z_r$, $B_r$, $C_r$ (the initial values of which are the incremental values $X_i$, $Y_i$, $Z_i$, $B_i$, $C_i$ respectively) every $\Delta T$ sec, $X_r$, $Y_r$, $Z_r$, $B_i$, $C_i$ having been stored in a remaining travelling distance memory 109:

$$X_r - \Delta X \rightarrow X_r \tag{4a}$$

$$Y_r - \Delta Y \rightarrow Y_r \tag{4b}$$

$$Z_r - \Delta Z \rightarrow Z_r \tag{4c}$$

$$B_r - \Delta B \rightarrow B_r \tag{4d}$$

$$C_r - \Delta C \rightarrow C_r \tag{4e}$$

When the following condition is established:

$$X_r = Y_r = Z_r = B_r = C_r = 0 \tag{5}$$

pulse distribution processing or other processing is performed on the basis of the next block of NC data preread by the NC data reader 102.

If a pick-feed instruction $M_{\square}$ is read out of the NC tape 101, the numerical control unit 104 immediately reads the next block of NC data and stores the data in the input memory 103. It should be noted that the NC data commanded following the pick-feed instruction are the position data Xn, Yn, Zn, Bn, Cn indicative of the machining starting point Ps of the second machining path PT2. These data are stored in the input memory 103.

Thereafter, a tool central axis vector arithmetic unit 110 responds to a calculation start signal from the numerical control unit 104 by obtaining, and storing in a vector memory 111, a tool central axis vector $\vec{Ve}$ (ie, je, ke) at the present position (the machining end point Pe on the first machining path PT1), and a tool central axis vector $\vec{Vs}$ (is, js, ks) at the machining starting point Ps on the second machining path PT2. Letting B represent the position of the tool in the direction of vertical rotation and C the position of the tool in the direction of horizontal rotation, the tool central axis vector can be calculated from the equations $$i = \sin B \cdot \cos C \tag{6a}$$

$$j = \sin B \cdot \sin C \tag{6b}$$

$$k = \cos B \tag{6c}$$

Accordingly, the tool central axis vector arithmetic unit 110 is capable of obtaining the tool central axis vectors $\vec{Ve}$, $\vec{Vs}$ from Eqs. (6a) through 6(c) by using the positions (Ba, Bn) and (Ca, Cn) along the directions of vertical and horizontal rotation of the machining end point Pe and machining starting point Ps, which are stored in the present position memory 108 and input memory 103, respectively.

Next, a point arithmetic unit 112 obtains the coordinate values of a retraction point Pa distanced from the cutting path end point Pe by l in the direction of the central axis of the tool at the end point, and the coordinate values of an approach point Pd distanced from the cutting path starting point Ps by l in the direction of the central axis of the tool at the starting point. The distance l and a plane equation $$ix + jy + kz = d \tag{7}$$

of the clearance plane CPL (where i, j and k express the normal line vector) are fed into a parameter memory 114 from a manual data input unit (MDI unit) 113 or the like.

Letting $\vec{Pe}$ and $\vec{Pa}$ be the position vectors at the cutting end point Pe and retraction point Pa, respectively, we have $$\vec{Pa} = \vec{Pe} + l \cdot \vec{Ve} \tag{8a}$$

Further, letting Ps amd Pd be the position vectors at the cutting starting point Ps and approach point Pd, respectively, we have $$\vec{Pd} = \vec{Ps} + l \cdot \vec{Vs} \tag{8b}$$

Accordingly, the point arithmetic unit 112 is capable of obtaining three-dimensional coordinate values of the retraction point Pa and of the approach point Pd from Eqs. (8a), (8b). These calculated coordinate values are applied as inputs to the numerical control unit 104 and an intersection arithmetic unit 115

When the coordinate values of the retraction point Pa and of the approach point Pd are received by the intersection arithmetic unit 115, this unit calculates the coordinate values of the points Pb, Pc of perpendiculars from the clearance plane CPL to the points Pa, Pd In general, letting h represent the distance to the foot Q (position vector Q) of a perpendicular from a clearance plane to a point P (position vector P) expressed by Eq. (7), the following will hold:

$$\vec{Q} = \vec{P} + h \cdot \vec{N} \tag{9a}$$

where $\vec{N}$ is the vector, expressed as (i, j, k), of the normal to the clearance plane, and h includes the sign. Accordingly, the coordinate values of the foot Q of the perpendicular will be specified if h in Eq. (9a) is found. Letting R (Rx, Ry, Rz) be one point on the clearance plane, the following will hold:

$$h = \vec{N} \cdot (\vec{R} - \vec{P}) \tag{9b}$$

If the direction of the plane as seen from the point P (Pc, Py, Pz) and the direction of N coincide, h will be positive; if not, h will be negative. Expressing Eq. (9b) in the form of axial components, we have $$h = i(Rx - Px) + j(Ry - Py) + k(Rz - Pz) \quad (9c)$$

Since R (Rx, Ry, Rz) resides on the clearance plane, the equation $$i \cdot Rx + j \cdot Ry + k \cdot Rz = d \quad (9d)$$

will hold if the substitutions x = Rx, y = Ry, z = Rz are made in Eq. (7). Accordingly, if Eq. (9d) is substituted into Eq. (9c), h will be given by the equation $$-h = i \cdot Px + j \cdot Py + k \cdot Pz - d \text{ tm} \quad (9e)$$

Therefore, the intersection arithmetic unit 115 is capable of deriving the coordinate values of the points Pb, Pc of perpendiculars from the clearance plane PL based on the retraction point Pa, the approach point Pd and the plane equation of the clearance plane, by using Eqs. (9a) and (9e). These calculated coordinate values are applied to the numerical control unit 104.

Thereafter, the numerical control unit 104 calculates the incremental values Xi, Yi, Zi along the respective three-dimensional axes from the machining end point Pe to the retraction point Pa from the equations $$XA - Xa \rightarrow Xi$$

$$YA - Ya \rightarrow Yi$$

$$ZA - Za \rightarrow Zi$$

by using the three-dimensional coordinate values (XA, YA, ZA) of the retraction point Pa. Thereafter, the calculations of Eqs. (1a)–(1c), (2a)–(2c) are performed as described above to obtain $\Delta X$, $\Delta Y$, $\Delta Z$, and these are applied to the pulse distributor 105 every $\Delta T$ seconds. The numerical control unit 104 performs the calculations of Eqs. (3a)–(3c), (4a)–(4c) every $\Delta T$ seconds. When the condition $$Xr \, 32 \, Yr = Zr = 0$$

is established, namely when the tool arrives at the retraction point Pc, the numerical control unit 104 uses the three-dimensional coordinate values (XB, YB, ZB) of the foot (point of intersection) Pb of the perpendicular to calculate, in similar fashion, the incremental values Xi, Yi, Zi along the respective three-dimensional axes from the retraction point Pa to the point of intersection Pb from the equations $$XB - Xa \rightarrow Xi$$

$$YB - Ya \rightarrow Yi$$

$$ZB - Za \rightarrow Zi$$

Thereafter, processing is executed which is exactly the same as that performed when the tool was moved from Pe to Pa. When the condition $$Xr = Yr = Zr \, 32 \, 0$$

is established, namely when the tool arrives at the point of intersection Pb, the numerical control unit 104 uses the three-dimensional coordinate values (Xc, Yc, Zc) of the foot (point of intersection) Pc of the perpendicular to calculate the incremental values Xi, Yi, Zi from the point of intersection Pb to the point of intersection Pc from the equations $$Xc - Xa \rightarrow Xi$$

$$Yc - Ya \rightarrow Yi$$

$$Zc - Za \rightarrow Zi$$

Thereafter, processing is executed which is exactly the same as that performed when the tool was moved from Pe to Pa. When the condition $$Xr = Yr \, 32 \, Zr = 0$$

is established, namely when the tool is moved on the clearance plane from the point of intersection Pb to the point of intersection Pc, the numerical control unit 104 performs the operations indicated by $$Bn - Ba \rightarrow Bi$$

$$Cn - Ca \rightarrow Ci$$

to calculate incremental values in the directions of vertical and horizontal rotation. Thereafter, the calculations of Eqs. (1d)–(1e), (2d)–(2e) performed to obtain $\Delta B$, $\Delta C$, and these are applied as inputs to the pulse distributor 105 every $\Delta T$ seconds. The numerical control unit 104 performs the calculations of Eqs. (3d)–(3e), (4d)–(4e) every $\Delta T$ seconds. When the condition $$Br = Cr = 0$$

is established, namely when the central axis of the tool is aligned in the direction of the central axis of the tool at the cutting starting point Ps, the numerical control unit 104 calculates the incremental values Xi, Yi, Zi from the point of intersection Pc to the approach point Pd from the equations $$XD - Xa \rightarrow Xi$$

$$YD - Ya \rightarrow Yi$$

$$ZD - Za \rightarrow Zi$$

by using the three-dimensional coordinate values (XD, YD, ZD) of the approach point Pd. Thereafter, processing is executed which is exactly the same as that performed when the tool was moved from Pe to Pa. When the condition $$Xr = Yr = Zr = 0$$

is established, namely when the tool arrives at the approach point Pd, the numerical control unit performs the operations indicated by $$Xn - Xa \rightarrow Xi$$

$$Yn - Ya \rightarrow Yi$$

$$Zn - Za \rightarrow Zi$$

to calculate incremental values Xi, Yi, Zi along the respective three-dimensional axes from the approach point Pd to the machining starting point Ps. Then, in a similar manner, $_\Delta X$, $_\Delta Y$, $_\Delta Z$ are found and applied as inputs to the pulse distributor 105 every $_\Delta T$ seconds. When the condition $Xr = Yr = Zr$ 32 0 is established, the NC data reader 102 is caused to read the next block of NC data. The second path is subsequently machined by moving the tool along the second machining path PT2 on the basis of the NC data.

The curved surface will eventually be machined if the foregoing operations are repeated.

The foregoing is for a case where the position B in the direction of vertical rotation and the position C in the direction of horizontal rotation are entered from the NC tape as data specifying the direction of the central axis of the tool. However, the tool central axis vector V (i, j, k) may be given instead of B and C. In such case, however, it is necessary to obtain the positions B, C in the directions of vertical and horizontal rotation from the tool central axis vector using the following equations prior to performing the calculations of (1a)–(1e):

$$B = \tan^{-1}(\sqrt{i^2 + j^2}/k)$$
$$C = \tan^{-1}(j/k)$$

In such case, the tool central axis vector arithmetic unit 110 is unnecessary [i.e., it is unnecessary to perform the calculations of Eqs. (6a)–(6c)].

Further, in the case described above, a pick-feed instruction is inserted into an NC program in advance, a pick-feed path is obtained automatically when the pick-feed instruction is read from the NC tape after the completion of machining along the first machining path, the tool is moved along the pick-feed path, and machining is subsequently performed along the second machining path. However, the present invention is not limited to such an arrangement. As an example, it can be arranged to enter data specifying a curved surface and data indicating a pick-feed, create NC data specifying a cutting path by using the curved surface data, obtain an NC tape by creating NC data for a pick-feed path through the above-described method on the basis of the data indicating the pick-feed, and machining the curved surface by loading the NC tape into an NC unit. Furthermore, it can be arranged to prepare in advance a series of NC data comprising NC data for specifying a cutting path, and pick-feed instructions, feed the data into an NC tape creating unit, obtain a pick-feed path through the above-described method based on a pick-feed instruction to create NC data specifying the pick-feed path, substitute these NC data for the pick-feed instruction thereby to recreate an NC tape containing pick-feed path data in place of the pick-feed instruction, and machine the curved surface by loading the NC tape into an NC unit.

Figure 5:
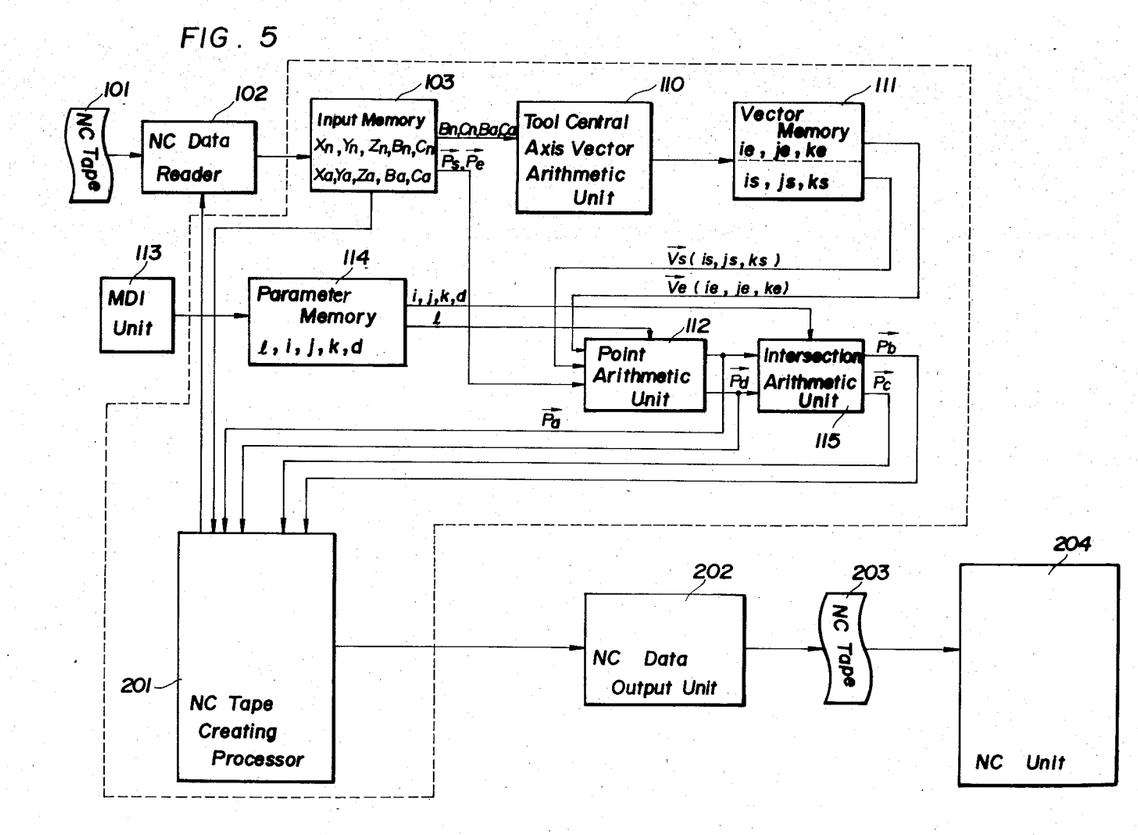
FIG. 5 is a block diagram of another embodiment of the present invention.

FIG. 5 is a block diagram of such an embodiment of the present invention. Portions similar to those shown in FIG. 4 are designated by like reference symbols. Stored in the NC tape or memory 101 are a number of NC data comprising NC data specifying a cutting path, and pick-feed instructions. It should be noted that the data specifying the paths need not necessarily be NC data but can be position data specifying the end points of very small straight lines when a curve is expressed as a polygonal approximation in the form of very small straight lines, as well as data specifying the direction of the central axis of the tool.

The NC data reader 102 reads NC data from the NC tape 101 one block at a time and stores the data in the input memory 103. Note that the input memory is designed to be capable of storing two blocks of path data. An NC tape creating processor 201 determines whether the present block of NC data stored in the input memory 103 is a pick-feed instruction. If it is not, the NC data are delivered as is to an NC data output unit (paper tape puncher, magnetic tape unit, etc.) 202, after which the NC data reader 102 is made to read the next block of NC data.

If the NC data stored in the input memory 103 are indicative of a pick-feed instruction, on the other hand, then the NC tape creating processor 201 causes the NC data reader 102 to read the next block of NC data, namely the three-dimensional position data Xn, Yn, Zn indicative of the machining starting point Ps on the second machining path, and the position data Bn, Cn in the directions of vertical and horizontal rotation, and to store these data in the input memory 103. Note that the three-dimensional position data Xa, Ya, Za indicative of the machining end point Pe on the first machining path and the position data Ba, Ca in the directions of vertical and horizontal rotation have also been stored in the input memory 103.

Thereafter, in response to a calculation start signal from the NC tape creating processor 201, the tool central axis vector arithmetic unit 110 obtains the tool central axis vector $\vec{V}e$ (ie, je, ke) at the present position (machining end point Pe on the first machining path PT1) from Eqs. (6a)–(6c) by using the vertical rotation position Ba and horizontal rotation position Ca stored in the input memory 103, obtains the tool central axis vector $\vec{V}s$ (is, js, ks) at the machining starting point Ps from Eqs. (6a)–(6c) by using the vertical rotation position Bn and horizontal rotation position Cn at the machining starting point Ps stored in the input memory 103, and stores these vectors in the vector memory 111.

The point arithmetic unit 112 and intersection arithmetic unit 115 then perform the calculations described above with relation to FIG. 4 to calculate the coordinate values of the retraction point Pa, points of intersection Pb, Pc and approach point Pd. These are applied as inputs to the NC tape creating processor 201. It should be noted that data specifying the distance 1 and the clearance plane are assumed to have already been entered from the MDI unit 113 or NC tape 101 and stored in the parameter memory 114.

When the three-dimensional coordinate values of the retraction point Pa, the points of intersection Pb, Pc and the approach point Pd are applied, the NC tape creating processor 201 first creates positioning data

G01 XXA, YYA, ZZA;

for effecting positioning from the cutting end point Pe to the retraction point Pa. These data are delivered to the NC data output unit 202. Next, the NC tape creating processor 201 creates positioning data

G01 XXB, YYB, ZZB;

for effecting positioning from the retraction point Pa to the point of intersection Pb. These data are delivered to the NC data output unit 202. Thereafter, the NC tape creating processor 201 creates positioning data G01 XXc, YYc, ZZc;

for effecting positioning from the point of intersection Pb to the point of intersection Pc. These data likewise are delivered to the NC data output unit 202.

The NC tape creating processor 201 then creates data needed to rotate the tool in the vertical and horizontal directions at the point of intersection Pc, by creating rotation direction positioning data G01 BBn, CCn;

for bringing the tool central axis vector into coincidence therewith at the machining starting point Ps, and delivers these data to the NC data output unit 202.

Thereafter, the NC tape creating processor 201 creates positioning data

G01 XXD, YYD, ZZD;

for effecting positioning from the point of intersection Pc to the approach point Pd and delivers these data to the NC data output unit 202. Finally, positioning data G01 XXn, YYn, ZZn;

is created for effecting positioning from the approach point Pd to the cutting starting point Ps, and these data are delivered to the NC data output unit 202. At the same time, the next block of NC data is read by the NC data reader 102, on the basis of which NC data the foregoing processing is repeated. In this manner, an NC tape 203 for creating a curved surface is created. Note that the NC data are assumed to be created in the form of absolute data.

The NC data stored on the NC tape 203 created through the foregoing processing are read by an NC unit 204, which proceeds to execute NC processing based on the read NC data. More specifically, a pick-feed is carried out after cutting is performed along the first machining path, cutting is implemented along the second machining path after the pick-feed, and the foregoing operations are subsequently repeated to machine the curved surface.

Figure 6:
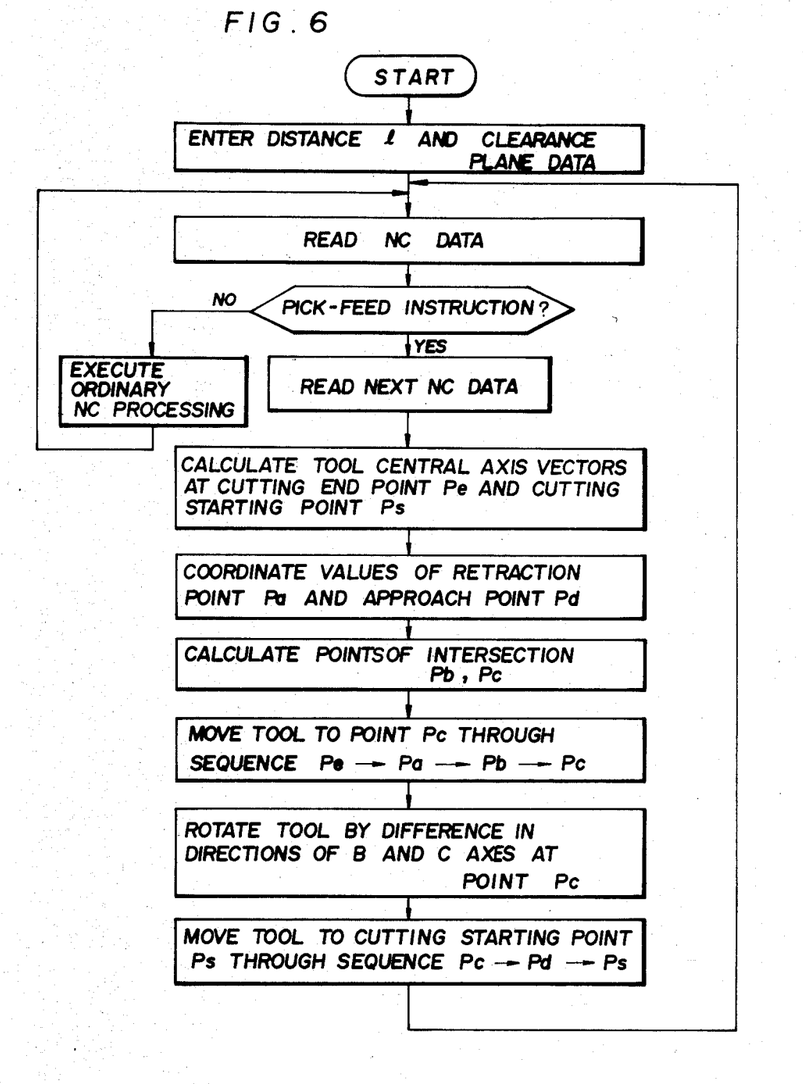
FIGS. 6 and 7 are flowcharts illustrating processing for a case where the logic of circuits of FIGS. 4 and 5 is accomplished by a microcomputer, respectively.
Figure 7:
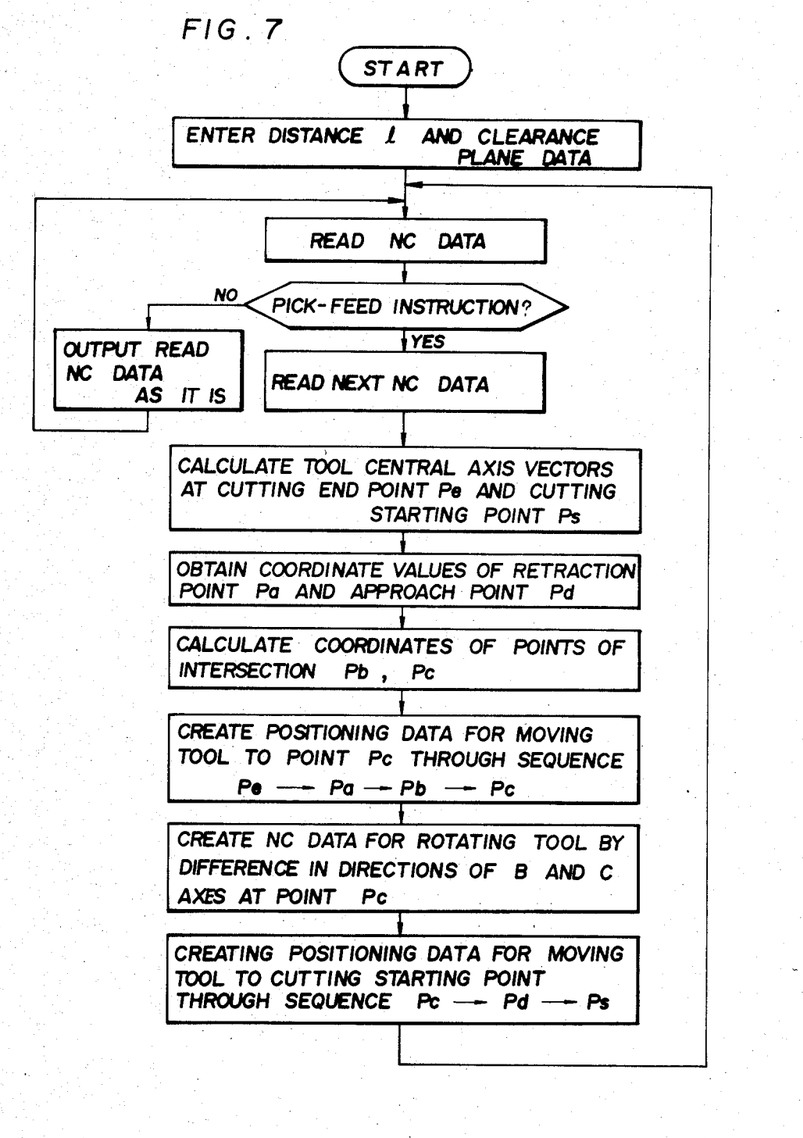

The circuitry enclosed by the dashed line in FIGS. 4 and 5 can be constituted by a microcomputer. In such case the flowcharts of the processing executed by the processors would be as shown in FIGS. 6 and 7, respectively.

According to the present invention as described above, in a machining method performed by a machine tool having axes of rotation for machining a curved surface by repeating a pick-feed and a unidirectional cutting operation performed by a tool, a pick-feed path which will not cause the tool to strike the workpiece can be created automatically even if the path is not specified by NC data, thereby simplifying programming. In addition, the path can be so created as to shorten the pick-feed stroke and curtail machining time.

We claim:

1. A method of machining using a machine tool having a tool and axes of rotation for subjecting a workpiece to desired machining, said method comprising the steps of:
    moving the tool, having a central axis, relative to a workpiece in one direction along a first cutting parh from a first maching start point;
    positioning the tool at a machining starting point on a second cutting path after the completion of machining along said first cutting path at a cutting path end point Pe;
    moving the tool relative to the workpiece along said second cutting path in said one direction to perform machining;
    specifying a tool retraction quantity for retracting the tool from the cutting path end point Pe;
    specifying a plane containing a path along which the tool is moved toward the second cutting starting point Ps, on said second cutting path;
    obtaining coordinate values of a point Pa distanced from the cutting path end point Pe by said tool retraction quantity in the direction of the central axis of the tool at the cutting path end point Pe;
    obtaining coordinate values of a point Pb in said plane on a perpendicular dropped from said plane to the point Pa;
    obtaining coordinate values of a point Pd distanced from the second cuttting path starting point Ps by said tool retraction qunatity in the direction of the central axis of the tool at the second cutting path starting point Ps;
    obtaining coordinate values of a point Pc in said plane on a perpendicular dropped from said plane to the point Pd;
    creating NC data, in accordance with the obtained coordinates, for positioning the tool at the second cutting startin point Ps along a pick feed path Pe→Pa→Pb→Pc→Pd→Ps;
    positioning the tool at the second cutting starting point by moving the tool along said pick feed path in accordance with said NC data; and
    performing machining by moving the tool along said second cutting path in said one direction.

2. A method of machining using a machine tool according to claim 1, further including the step of;
    creating NC data for orienting, at said point Pc, the central axis of the tool in a direction of the central axis of the tool at the second machining starting point Ps.

3. A method of machining using a machine tool having a tool and axes of rotation for subjecting a workpiece to desired machining said method comprising the steps of:
    moving the tool, having a central axis, relative to the workpiece in one direction along a first cutting path from a first machining start point on the basis of NC data;
    positioning the tool at a machining starting point on second cutting path after the completion of machining along said first cutting path at a cutting path end point Pe;
    moving the tool relative to the workpiece along said second cutting path in said one direction to perform machining;
    specifying a tool retraction quantity for retracting the tool from the cutting path end point Pe;
    specifying a plane containing a path along which the tool is moved toward the second cutting starting point Ps, on said second cutting path;
    obtaining coordinate values of a point Pa distanced from the cutting path end point Pe by said tool retraction quantity in the direction of the central axis of the tool at the cutting path end point Pe;

obtaining coordinate values of a point Pb in said plane on a perpendicular dropped from said plane to the point Pa;

obtaining coordinate values of a point Pd distanced from the second cutting path starting point Ps by said tool retraction quantity in the direction of the central axis of the tool at the second cutting path starting point Ps;

obtaining coordinate values of a point Pc in said plane on a perpendicular dropped from said plane to the point Pd;

positioning the tool at the second cutting starting point Ps along a pick feed path Pe→Pa→Pb→Pc→Pd→Ps; and performing machining by moving the tool along said second cutting path.

4. A method of machining using a machine tool according to claim 3, further including the step of:
orienting, at said point Pc, the central axis of the tool in a commanded direction.

5. A method of machining using a machine tool according to claim 3, further including the step of:
inserting into said NC data an instruction, for moving the tool from the cutting path end point Pe to the second cutting path starting point Ps, between items of said NC data specifying cutting paths;

obtaining the points Pa, Pb, Pc, Pd in response to said instruction; and moving the tool along the path Pe→Pa→Pb→Pc→Pd→Ps.

* * * * *

UNITED STATES PATENT AND TRADEMARK OFFICE
CERTIFICATE OF CORRECTION

PATENT NO. : 4,692,873  Page 1 of 2
DATED : September 8, 1987
INVENTOR(S) : Hajimu Kishi; Kunio Tanaka It is certified that error appears in the above-identified patent and that said Letters Patent is hereby corrected as shown below:

[57] Line 7, "l" should be -- $\ell$ --;
    Line 14, "l" should be -- $\ell$ --;
    Line 19, "l" should be -- $\ell$ --.

Col. 1, Line 10, "machining" should be -- machining; --;
    Line 15, "machining," should be -- machining; --.

Col. 2, Line 48, "l" should be -- $\ell$ --;
    Line 55, "l" should be -- $\ell$ --;
    Line 61, "l" should be -- $\ell$ --.

Col. 3, Line 43, "l" should be -- $\ell$ --;
    Line 61, "Pd" should be -- Pd. --;
    Line 61, before "point" insert -- the --.

Col. 4, Line 5, "3," should be -- 3 --;
    Line 66, formula "(2e)" should be -- (2d) --;
    Line 68, formula "(23)" should be (2e) --.

Col. 5, Line 42, "0(5)" should be -- 0        (5) --.

Col. 6, Line 5, "K=cosB(6c)" should be -- K=cosB    (6c) --;
    Line 17, "l" should be -- $\ell$ --;
    Line 20, "l" should be -- $\ell$ --;
    Line 22, "l" should be -- $\ell$ --;
    Line 24, "d(7)" should be -- =d    (7) --;
    Line 34, formula (8a), "l" should be -- $\ell$ --;
    Line 36, "Ps amd Pd" should be -- $\vec{Ps}$ and $\vec{Pd}$ --;

UNITED STATES PATENT AND TRADEMARK OFFICE
CERTIFICATE OF CORRECTION

PATENT NO. : 4,692,873

DATED : September 8, 1987

INVENTOR(S) : Hajimu Kishi; Kunio Tanaka

It is certified that error appears in the above-identified patent and that said Letters Patent is hereby corrected as shown below:

Col. 6, Line 40, formula (8b), "1" should be -- $\vec{l}$ --;
    Line 55, "P)" should be -- $\vec{P}$) --.

Col. 7, Line 16, "-dtm (9e)" should be -- -d$\vec{tm}$ (9e) --;
    Line 44, "Xr32" should be -- Xr= --;
    Line 64, "Zr32" should be -- Zr= --.

Col. 8, Line 16, "Yr32" should be -- Yr= --.

Col. 9, Line 5, "Zr320" should -- Zr=0 --.

Col. 10, Line 31, "$\vec{Ve}$" should be -- $\vec{Ve}$ --;
    Line 36, "$\vec{Vs}$" should be -- $\vec{Vs}$ --;
    Line 47, "1" should be -- $\vec{l}$ --.

Col. 11, Line 68, "parh" should be -- path --;
    Line 68, "maching" should be -- machining --.

Col. 12, Line 31, "startin" should be -- starting --.

Signed and Sealed this

Twelfth Day of April, 1988

Attest:

DONALD J. QUIGG

*Attesting Officer*      *Commissioner of Patents and Trademarks*